A. ALLEN.
INCUBATOR.
APPLICATION FILED DEC. 26, 1912.
1,153,184.
Patented Sept. 14, 1915.
2 SHEETS—SHEET 1.
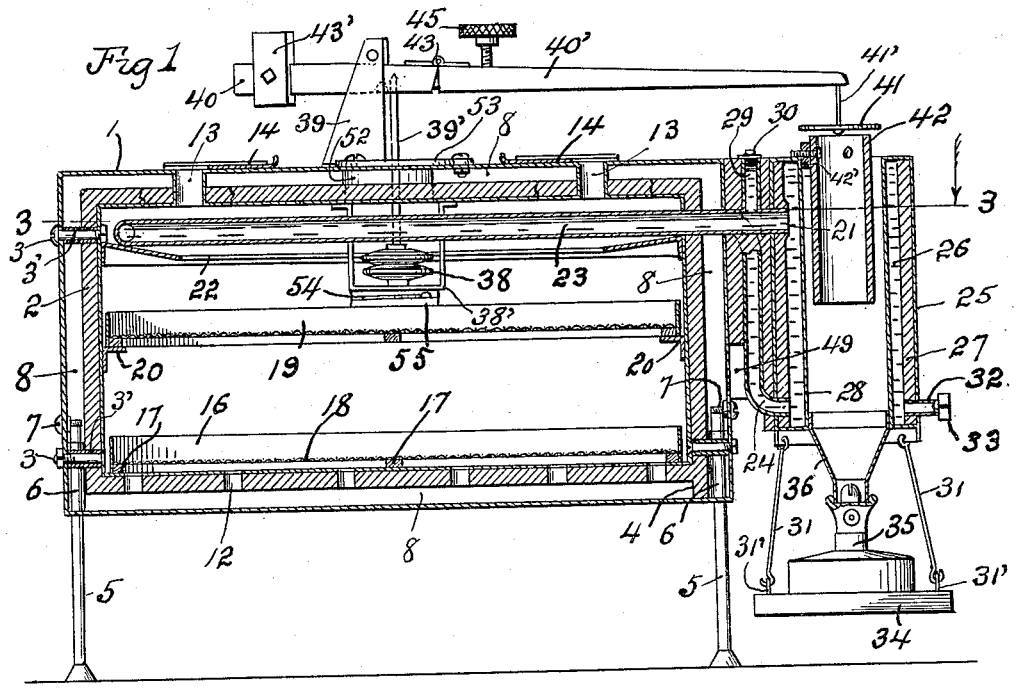
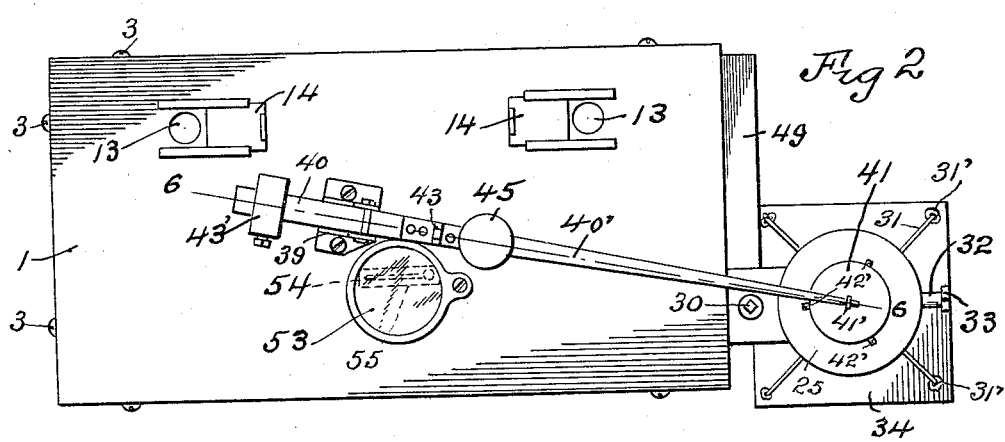
WITNESSES:
R.E. Hamilton
E. B. House
INVENTOR.
Ambrose Allen
BY
Warren D. House
His ATTORNEY.

A. ALLEN.
INCUBATOR.
APPLICATION FILED DEC. 26, 1912.
1,153,184.
Patented Sept. 14, 1915.
2 SHEETS—SHEET 2.
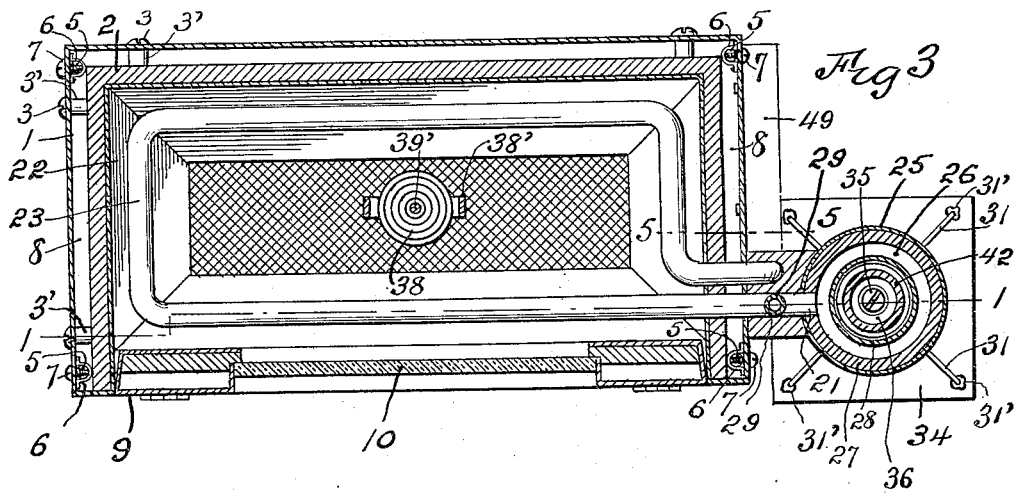
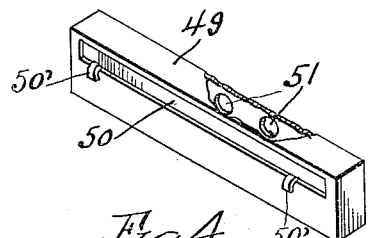
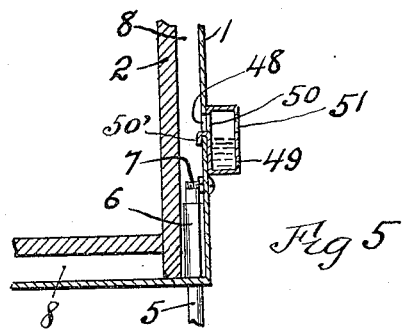
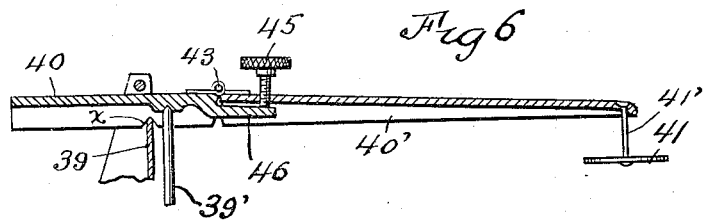
WITNESSES:
R. E. Hamilton
E. B. House
INVENTOR.
Ambrose Allen
BY Warren D. House
His ATTORNEY.

UNITED STATES PATENT OFFICE.

AMBROSE ALLEN, OF KANSAS CITY, MISSOURI.

INCUBATOR.

1,153,184.  Specification of Letters Patent.  Patented Sept. 14, 1915.

Application filed December 26, 1912. Serial No. 738,673.

*To all whom it may concern:*

Be it known that I, AMBROSE ALLEN, a citizen of the United States, residing at Kansas City, in the county of Jackson and State of Missouri, have invented a certain new and useful Improvement in Incubators, of which the following is a specification.

My invention relates to incubators.

It has for its object the providing of improved means for heating the incubation chamber.

The novel features of my invention are hereinafter fully described and claimed.

In the accompanying drawings which illustrate the preferred form of my invention, Figure 1 is a vertical sectional view on the broken line 1—1 of Fig. 3, some parts being broken away. Fig. 2 is a plan view of the incubator. Fig. 3 is a horizontal section on the line 3—3 of Fig. 1. Fig. 4 is a perspective view, partly broken away, of the tank for containing water for moistening the air introduced into the incubator. Fig. 5 is a vertical section on the line 5—5 of Fig. 3. Fig. 6 is a vertical sectional view on the line 6—6 of Fig. 2.

Similar reference characters designate similar parts in the different views.

1 is an outer casing in which is mounted an incubation chamber 2 supported by horizontal bolts 3 which extend through the casing 1, spacing sleeves 3' being mounted on said bolts 3. The right end of the chamber 2, as viewed in Fig. 1 is provided at its lower end with a vertical extension 4 which rests upon the bottom of the casing 1 and serves as a partition across the space 8 provided between the casing 1 and chamber 2. Vertical removable supporting legs 5, four in number extend through the bottom of the casing 1 and through keepers 6 secured to the casing 1, the upper ends of said legs bearing against transverse stops 7 extending through the casing 1. A door 9 is provided at the front of the casing 1, said door having, preferably a transparent panel 10 through which the interior of the chamber 2 may be viewed, said chamber at its forward side being normally closed by the door 9.

12 are openings extending vertically through the bottom of the chamber 2 and communicating with the space 8 between said chamber and the casing 1, see Fig. 1. The top of casing 1 is provided with vertical vents 13 which also extend through to the chamber 2 and have their upper ends normally closed by slides 14 mounted on top of the casing 1. By regulating the slides 14, the draft through the incubation chamber 2 may be regulated.

16 is a tray having horizontal end cleats 17 for supporting a screen bottom 18. This tray is adapted to contain eggs and is adapted to be mounted removably on the bottom of the chamber 2, as shown in Fig. 1, or upon brackets 20 secured to the inner end walls of the chamber 2, said brackets being also adapted to removably support another tray 19 also having a screen bottom adapted to support eggs.

Extending inwardly and downwardly from the side and end walls of the chamber 2 is a shelf 22 which supports a hot water coil 23 the ends 21 and 24' of which are respectively in communication with an annular chamber 26 of a water heater 25 which is provided vertically therethrough with a central draft tube 28, as is best shown in Fig. 1. 27 is a non heat conducting lining of asbestos or similar material located in the heater 25 and forming the outer wall of the annular water space 26.

Extending vertically from the part 21 of the coil 23 is a filling pipe 29 which extends through the casing 1 and is provided with a removable plug 30. A drain tube 32 connects with the lower portion of the space 26 and extends horizontally through the lining 27 and the outer wall of the heater 25. The outer end of the tube 32 is provided with a removable closure 33. A horizontal platform 34 is suspended by rods 31 from the lower end of the heater 25 and supports a heater, such as a lamp 35 which is provided with a chimney 36 which discharges at its upper end in the draft tube 28.

From the above description it will be seen that the annular space 26 and the coil 23 form a closed circulatory water heating system the water in which is heated by the lamp 35. For regulating the heating of the water the following described mechanism is preferably employed. A U shaped support 38' having its upper ends secured to the under side of the top of the chamber 2, supports an ordinary vertically expansible and contractible thermostat 38 the upper side of which supports the lower end of a vertical rod 39', the upper end of which bears against the under side of a horizontal lever 40, preferably of inverted U shape, the downwardly extending arms of which are provided with V shaped notches *x*, Fig. 6, in which is located the upper edge of a bracket 39 which is supported on the top of the casing 1.

Pivoted to swing vertically on the right end of the lever 40, Fig. 6, is a horizontal lever 40′ one end of which is secured to a hinge 43 which is secured by its other leaf to the lever 40. The other end of the lever 40′ has secured to it the upper end of a vertical rod 41′ the lower end of which supports a horizontal disk damper 41 which is adapted to close more or less the upper end of a vertical draft tube 42 located in and having less external diameter than the internal diameter of the draft tube 28. The tube 42 is supported by lugs 42′ secured to the upper end of the heater 25. The draft tube 42 is made preferably of non heat conducting material, such as asbestos, so that when the heat passes through said tube it will not be conducted to the water contained in the annular space 26.

As shown in Fig. 6 a vertical adjusting screw 45 extends through and is fitted in a threaded hole in the lever 40′, the lower end of the screw resting upon a horizontal extension 46 of the lever 40. By adjusting the screw 45, the position of the damper 41 relative to the upper end of the tube 42 may be changed to suit conditions required. A longitudinally adjustable counter weight 43′ is mounted on the lever 40 at the side of the bracket 39 opposite to that at which is located the lever 40′.

When the temperature in the incubation chamber 2 rises, the expansion thereby of the thermostat 38 will lift the damper 41, through the intermediacy of the rod 39′, lever 40, lever 40′ and rod 41′, thereby increasing the size of the discharge opening at the upper end of the tube 42 so as to permit the passage therethrough of a greater amount of the gaseous products of combustion from the lamp 35, a portion of which have been passing out through the annular space between the tube 28 and the tube 42. The reduction of the amount of gaseous products passing from the tube 28 outside of the tube 42 correspondingly reduces the heating effect of such gaseous products upon the water contained in the annular space 26, and also, thereby, correspondingly effects a lowering of the temperature of the water which passes through the coil 23. As the temperature within the coil 23 lowers a corresponding lowering of the temperature of the air in the incubation chamber is effected, and such lowering of the temperature progresses until by reason of the contraction of the thermostat 38, the damper 41 is again lowered so as to shut off a portion of the draft through the tube 42. Such lowering of the damper 41 causes a greater portion of the heated products of combustion to pass from the tube 28 between said tube and the tube 42, thereby effecting an increase in temperature of the water in the circulatory system and of the temperature in the incubator chamber 2.

For properly moistening the air which enters the chamber 2, I provide one end of the casing 1 with an air inlet 48 which is adapted to register with a port 50 in one side of a water tank 49, shown in Fig. 4, said tank having hooks 50′ adapted to be inserted in the inlet 48 for engagement with the end wall of the casing 1 so as to support the tank 49 in the position shown in Fig. 5. Above the water level in the tank 49, said tank is provided in its outer side wall with air inlet openings 51. Air entering the tank 49 by the inlet openings 51 absorbs moisture from the water in the tank and then passes through the port 50 and inlet 48 into the annular space 8, passing therethrough upwardly, thence horizontally over the chamber 2, thence downwardly at the other end of said chamber and thence under said chamber and through the openings 12 into the chamber 2, finally emerging therefrom by way of the vents 13 in the top of said chamber.

Supported in any suitable manner, as by a shelf 55 hanging from the support 38′, is a thermometer 54 located adjacent to the thermostat 38 and to eggs carried in the tray 16 or 19 as the case may be. A vertical tube 52, which extends through the upper part of the chamber 2 and the casing 1, has its upper end normally closed by a door 53 having a transparent pane through which one may view the thermometer 54.

By having a hermetically tightly closed circulatory water heating system, it is unnecessary to replenish the system with water from time to time, as escape of the water through evaporation to the atmosphere does not occur.

By providing the shelf 22 for supporting the coil 23, the heat from the coil is diffused throughout the chamber 2 and is not concentrated upon certain of the eggs adjacent to the coil as would be the case without the presence of the shelf or guard 22. The shelf 22 thus effects a double function, that of supporting the coil 1 and of diffusing the heat therefrom.

By providing the detachable legs 5 said legs may be detached for the purpose of disposing the incubator in compact form for storage or shipping.

It will be noted, Fig. 1, that the rods 31 have hooks at their lower ends for detachable connection with eyes 31′ with which the platform 34 is provided. When it is desired to store or ship the incubator, the rods 31 may be detached from the eyes 31′, so as to enable the lamp 35 and platform 34 being packed in the chamber 2. In like manner the levers 40 and 40' may be detached and placed in said chamber.

I do not limit my invention to the structure shown and described, as modifications, within the scope of the appended claim, may be made without departing from the spirit of my invention.

Having thus described my invention, what I claim and desire to secure by Letters Patent, is:—

In an incubator, an incubation chamber having air inlet openings in its bottom and having air outlet holes in its top, a casing inclosing said chamber and spaced apart therefrom so as to form an air channel passing over the top, at the ends, and at the bottom of said chamber, the channel at the bottom communicating with said inlet openings, the casing having at one end an air inlet communicating with said channel, a partition dividing said channel transversely adjacent to the air inlet of the casing and at the bottom side of said chamber, and means for heating the air as it passes upwardly through said chamber.

In testimony whereof I have signed my name to this specification in presence of two subscribing witnesses.

AMBROSE ALLEN.

Witnesses:
WARREN D. HOUSE,
AUSTIN CHARZIE.

Copies of this patent may be obtained for five cents each, by addressing the "Commissioner of Patents, Washington, D. C."